United States Patent [19]

Sutton

[11] Patent Number: 5,055,835
[45] Date of Patent: Oct. 8, 1991

[54] TRACK TO TRAIN COMMUNICATION SYSTEMS

[75] Inventor: Malcolm S. Sutton, Borrowash, United Kingdom

[73] Assignee: British Railways Board, London, England

[21] Appl. No.: 460,184

[22] PCT Filed: Jul. 27, 1988

[86] PCT No.: PCT/GB88/00611
§ 371 Date: Feb. 15, 1989
§ 102(e) Date: Feb. 15, 1989

[87] PCT Pub. No.: WO89/00940
PCT Pub. Date: Feb. 9, 1989

[30] Foreign Application Priority Data

Aug. 5, 1987 [GB] United Kingdom ................. 8718552

[51] Int. Cl.[5] .............................................. H04B 7/00
[52] U.S. Cl. ................................ 340/825.54; 340/572; 340/573
[58] Field of Search ...................... 340/825.54, 825.58, 340/825.71, 825.73, 825.75, 572, 573, 539; 342/51, 44; 315/22, 23, 42, 62, 88

[56] References Cited

U.S. PATENT DOCUMENTS

| | | | |
|---|---|---|---|
| 3,964,024 | 6/1976 | Hutton et al. | 340/825.3 |
| 4,040,053 | 8/1977 | Olsson | 342/42 |
| 4,364,043 | 12/1982 | Cole et al. | 340/825.54 |
| 4,517,563 | 5/1985 | Diamant | 340/825.54 |
| 4,724,427 | 2/1988 | Carroll | 340/825.54 |
| 4,752,776 | 6/1988 | Katzenstein | 340/825.54 |
| 4,864,292 | 9/1989 | Nieuwkoop | 340/825.54 |
| 4,893,118 | 1/1990 | Lewiner et al. | 340/825.54 |

FOREIGN PATENT DOCUMENTS 1530405 6/1965 Fed. Rep. of Germany .
1483692 8/1977 United Kingdom .

Primary Examiner—Donald J. Yusko
Assistant Examiner—Dervis Majistre
Attorney, Agent, or Firm—Davis, Bujold & Streck

[57] ABSTRACT

A transponder circuit comprises a loop (4) for inductively coupling with an interrogator (2) to transmit a binary coded message to the interrogator (2); the loop (4) forms part of a tuned circuit which is tuned to a first resonant frequency Fc and which is detunable, by an associated modulator, to a second lower frequency Fc/2 whereby a binary code can be created utilizing the two frequencies; and advantageously, a binary "1" and a binary "0" each comprise two cycles of Fc and one cycle of Fc/2 with a binary "0" having the reverse sequence of the frequencies to a binary "1".

3 Claims, 1 Drawing Sheet

TRACK TO TRAIN COMMUNICATION SYSTEMS

This invention relates to track to train communication systems employing track mounted transponders.

BACKGROUND OF THE INVENTION

We first applied transponders too high speed lines in 1974. Transponders provided the track-to-train communication medium required by a speed advisory system for the Advanced Passenger Trains. By using a tilting system, these trains were able to traverse curves at speeds much higher than is acceptable for conventional trains. So that drivers were not required to learn a new set of line speeds, each train was fitted with a speed advisory system, which displayed the appropriate line speed in the cab. Speed and other control information was encoded into pre-determined messages which were held in transponders mounted on the track; the transponders were activated from the train and the messages were read by train mounted interrogators.

More recently, journey times have been reduced by the maximum line speed on relatively straight track from 160 km/h to 200 km/h, and by the introduction of high performance non tilting rolling stock, notably the diesel powered High Speed Train (HST).

On the British railway system, high speed trains are manually driven, and the drivers are highly dependent on route knowledge. The only in-cab indications are provided by an automatic warning system (AWS) which advises of approaching restrictive signals and critical speed restrictions. Trains having a maximum speed greater than 160 km/h have two drivers in the cab; otherwise, driving cabs are generally single manned.

200 km/h is regarded as the maximum safe speed for driving to lineside signals; above this speed cab signalling and speed supervision are required. Even at lower speeds, some form of driver aid may be justified by reduced driver route learning, achievement of single manning on all trains, and improved safety.

The potential of transponder technology has therefore justified investment in a research programmed. The aim has been to build upon the experience and understanding derived from the earlier system, such that an appropriate transponder system can be developed quickly and confidently when a specific requirement arises.

One technique used in transponder technology is based on inductive coupling. Induction provides a relatively efficient mechanism for energising transponders, and ensures that they can be activated only when they are close to an interrogator. The latter is an important feature in a train control system.

The transponders have been designed to work in the low radio frequency band. This band is particularly suitable as, at these frequencies, the signals are completely unaffected by water and wet snow.

The transponders have had no internal power source and have received their energy from a carrier signal generated by the interrogator. The interrogator transmitter circulated a high frequency current in a loop antenna. The resulting magnetic field induced a corresponding current in a loop antenna in the transponder. The transponder generated a phase modulated return signal at half the frequency of the received carrier.

Analysis of the operation of the known transponder system has shown that a greatly enhanced return signal can be achieved by making the frequency of the return signal the same as that of the carrier. In the limit, all of the current flowing in the transponder antenna constitutes a source of the return signal. The return signal is seen at the interrogator as amplitude modulation of the transmitted signal.

Based on this concept the object of the invention is to provide a transponder system which has high energy efficiency and therefore enables a high modulation rate to be applied, i.e. a high data rate. This in turn allows short compact interrogator aerials to be used.

According to one aspect of the invention a transponder circuit for transmitting a coded message comprises a tuned circuit tuned to a first, resonant frequency and detunable to a second frequency by an associated modulator, whereby the coded message from said transponder can be made up of sequences of said frequencies in predetermined combinations.

According to another aspect of the invention there is provided a loop for inductively coupling with an interrogator to transmit a binary coded message to the interrogator, wherein the loop forms part of a tuned circuit which is tuned to a first, resonant frequency and which is detunable by an associated modulator to a second, lower frequency whereby a binary code can be created utilizing said two frequencies.

Figure 1:
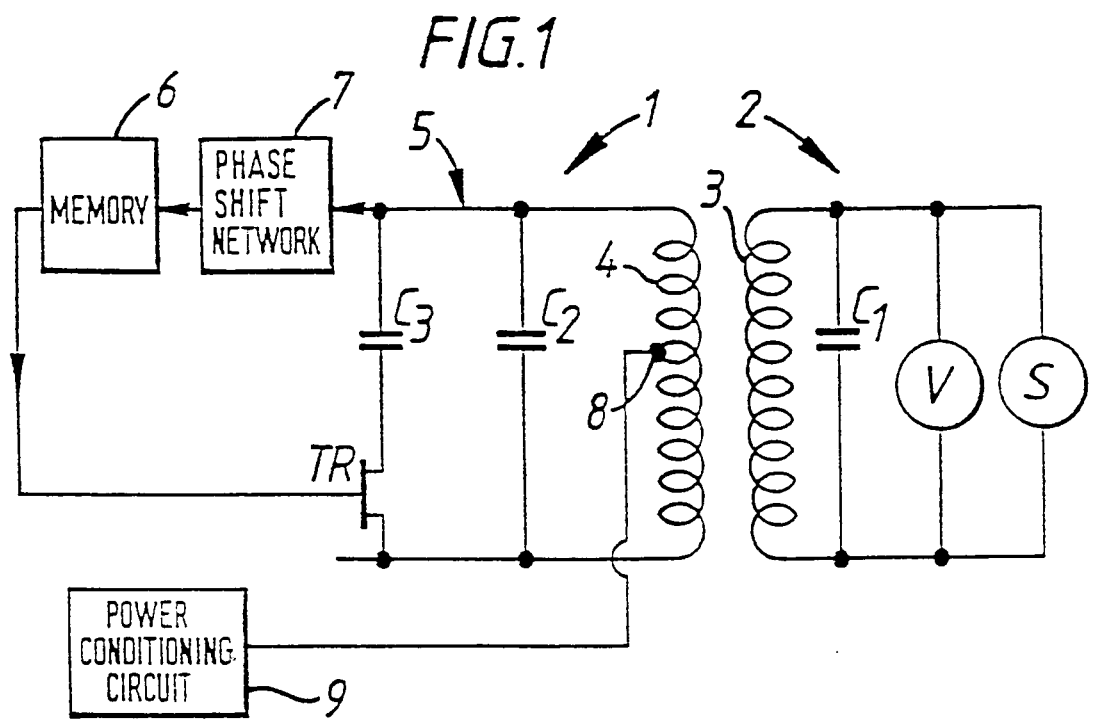
FIG. 1 shows a schematic diagram of a transponder system utilizing a transponder circuit according to the present invention.

A schematic circuit diagram of one transponder system utilizing a transponder circuit in accordance with the invention is shown in FIG. 1 of the accompanying drawing.

DESCRIPTION OF THE PREFERRED EMBODIMENT

The transponder circuit is indicated by the general reference 1 and the interrogator by general reference 2.

The easiest way of understanding the transponder system is to consider it as a loosely coupled air spaced transformer. Interrogator aerial 3 is the primary and the aerial loop 4 of the transponder circuit 2 is the loosely coupled secondary winding. From transformer theory it can be shown that any load impedance connected to the loop i.e. the secondary can be referred back to the primary as an equivalent impedance. It is this referred impedance that is the mechanism for data transfer.

By modulating the impedance connected to the coil 4 a modulation voltage V will appear in the interrogator circuit 2 by the action of the primary current acting on the referred impedance. This is the return signal and is in contrast to traditional transponder systems which use separate frequencies for the go and return channels.

The loop 4 forms part of a tuned circuit 5 as will be described.

Figure 2:
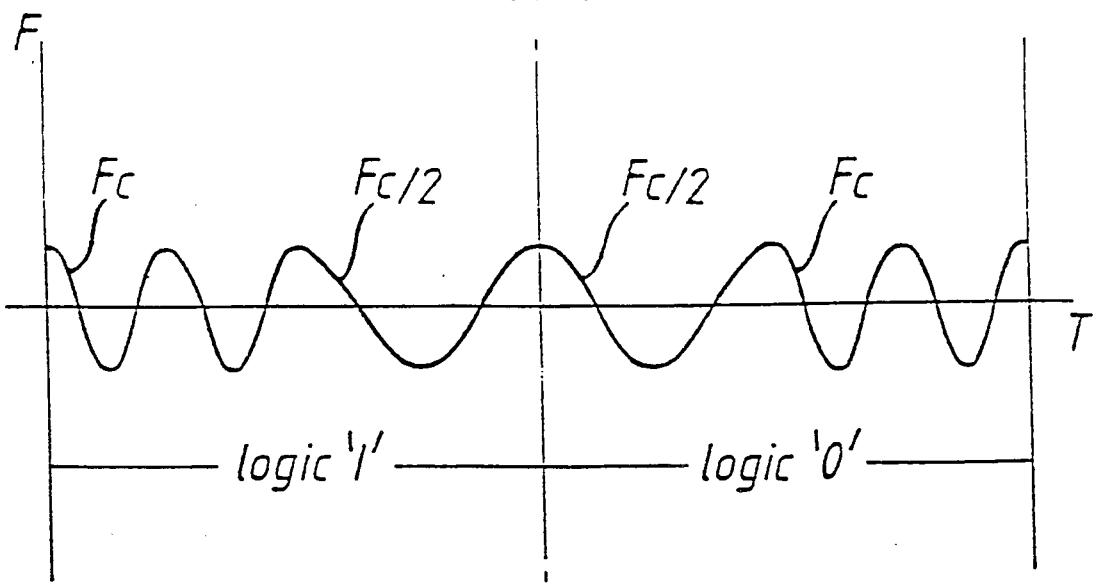
FIG. 2 diagrammatically shows a graph of the frequency modulation scheme of the present invention.

The modulation method chosen in this embodiment is coherent fsk with a constant (50%) mark : space ratio. By switching the resonant carrier frequency of the transponder loop 4 between Fc and Fc/2, the frequency referred impedance in the primary circuit, evaluated at Fc, is low and high respectively. This results in a change in the primary voltage V and is the transponder return signal. If logic 1's are defined as 2 cycles of Fc followed by 1 cycle of Fc/2 and logic 0's are defined as 1 cycle of Fc/2 followed by 2 cycles of Fc as shown in FIG. 2 then a constant ratio binary code results with the transponder operating for 50% of the time at Fc. This is sufficient condition for constant, data invariant, energy transfer to the transponder. This is a very advantageous feature of the transponder design.

The interrogator aerial is tuned to Fc by capacitor $C_1$. The transponder loop 4 is tuned to Fc by capacitor $C_2$ connected in the tuned circuit 5. The clock to drive the transponder logic is derived from the transponder loop 4 and is fed to the memory 6 via phase shift network 7. The data storage method in memory 6 is by EEPROM (electronically erasable programmable read only memory). The EEPROM is a 128 or 256 bit serial output memory, but could be of any length. It is used with three memory locations per data bit.

As implied above one data bit period is composed of 2 cycles of Fc and 1 cycle of Fc/2 making a total of 3 complete cycles of the circuit; during this period the interrogator will have completed 4 cycles of Fc. Thus, referring to FIG. 2, in this embodiment a binary logic '1' comprises 2 cycles of Fc followed by one cycle of Fc/2 and a binary logic '0' comprises 1 cycle of Fc followed by 2 cycles of Fc/2, i.e. the reverse sequence to a binary '1'

The output from the memory 6 is used to control the modulation of the transponder circuit. The modulator consists of a power FET TR and capacitor C3 connected in the tuned circuit 5. The switching of TR is controlled by the output from the memory. When TR is not conducting the circuit 5 resonates at Fc and is tuned by C2 only. When TR is conducting C3 is effectively in parallel with C2 and tunes the circuit 5 to Fc/2. C3 is approximately equal to 3xC2. The clock circuit ensures that the frequency change occurs on the positive peak of the circuit waveform as can be appreciated from FIG. 2. This enables TR to open or close at a current minima and maintain a phase continuous signal in the circuit. Also C3 is left with a high residual charge when TR opens. This charge is retained until the next cycle of Fc/2 is required when it is available to smoothly continue the tank circuit waveform.

The modulator is deliberately designed as a parallel network to minimise the amount of time the transistor "on resistance" is active in the circuit. This is to minimise circuit losses.

The power for energising the transponder circuit 1 is supplied from the interrogator 2 and is derived from a tap 8 on the loop 4 which connects to a power conditioning circuit 9.

A unique feature of the above described design of transponder circuit is the use of a phase coherent modulator. This achieves a high level of amplitude modulation at the carrier frequency (Fc) by diverting energy into a secondary capacitor C3. This energy is reused at a later time and contributes significantly to the efficiency of the circuit.

I claim:

1. A transponder circuit, for transmitting a coded message to an interrogator, comprising:
   a) an aerial for inductively coupling with the interrogator, the transponder circuit being energised through the inductive coupling and the transponder transmitting its coded message to said interrogator through the inductive coupling,
   b) a first capacitor connected in a circuit with said aerial whereby a tuned circuit is provided tuned to a first frequency, and
   c) a phase coherent frequency modulator comprising:
      (i) a second capacitor connectable into said tuned circuit whereby to retune said tuned circuit to a second lower frequency, the relative values of said first and second capacitors being such that said first frequency is an integer multiple of said second frequency,
      (ii) switching means arranged to connect the second capacitor periodically into and out of the tuned circuit,
      (iii) a data memory whose stored data is output in a predetermined timed sequence, when said transponder circuit is energised, to provide a sequence of control signals to said switching means whereby to switch said second capacitor into and out of said tuned circuit according to a predetermined sequence whereby a coded message is output from said transponder circuit, each bit of which is made of a predetermined combination of cycles of said first and second frequencies, and
      (iv) a clock energised through said inductive coupling and whose clock pulses control the timing of the control signals output from said memory, whereby the switching between said first and second frequencies occurs with phase coherence and whereby the switching of the second capacitor into and out of said tuned circuit occurs at voltage maximum whereby energy is stored in said second capacitor when it is disconnected from the tuned circuit and is released when said second capacitor is reconnected to the tuned circuit.

2. A transponder circuit according to claim 1, wherein the modulator is a binary fsk modulator.

3. A transponder circuit according to claim 2, wherein the modulator has a constant (50%) mark; space ratio, the relative values of said first and second capacitors are such that said first frequency is twice said second frequency whereby the coded message is in binary form each bit of which comprises two cycles of said first frequency and one cycle of said second frequency, and the memory is arranged too control said switching means so that one bit of the binary code comprises one cycle of said second frequency followed by two cycles of said first frequency, and the other bit comprises two cycles of said first frequency followed by one cycle of said second frequency.

* * * * *